US008848716B2

(12) United States Patent
Ramakrishnan et al.

(10) Patent No.: US 8,848,716 B2
(45) Date of Patent: Sep. 30, 2014

(54) TERMINATION OF A PSEUDOWIRES ON MULTIPLE LINE CARDS

(75) Inventors: Vijayan Ramakrishnan, Milpitas, CA (US); Sami Boutros, San Ramon, CA (US); Leo Chun-Chuen Chan, Los Altos, CA (US); Reshad Rahman, Ottawa (CA); Sundar Siddaramaiah Bettadahalli, Fremont, CA (US); Sivakumar Subramaniyan Ganapathy, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 222 days.

(21) Appl. No.: 13/084,531

(22) Filed: Apr. 11, 2011

(65) Prior Publication Data

US 2012/0257629 A1 Oct. 11, 2012

(51) Int. Cl.
*H04L 12/28* (2006.01)
*H04L 12/56* (2006.01)
*G06F 15/16* (2006.01)

(52) U.S. Cl.
USPC ............ 370/392; 370/389; 370/401; 709/227

(58) Field of Classification Search
USPC ................. 370/230–252, 389–392, 401–458, 370/254–392; 709/213–238
See application file for complete search history.

(56) References Cited

U.S. PATENT DOCUMENTS

| | | | |
|---|---|---|---|
| 7,417,950 B2* | 8/2008 | Hofmeister et al. | 370/230 |
| 7,499,456 B2* | 3/2009 | De Silva et al. | 370/395.53 |
| 7,516,224 B2* | 4/2009 | Guichard et al. | 709/227 |
| 7,596,629 B2* | 9/2009 | Luo | 709/238 |
| 7,599,303 B2* | 10/2009 | Nadeau et al. | 370/248 |
| 7,773,611 B2* | 8/2010 | Booth et al. | 370/401 |
| 7,782,841 B2* | 8/2010 | Rampal et al. | 370/352 |
| 7,953,004 B2* | 5/2011 | Poulin et al. | 370/230 |
| 7,974,223 B2* | 7/2011 | Zelig et al. | 370/258 |
| 8,001,252 B2* | 8/2011 | Guichard et al. | 709/227 |
| 8,018,839 B2* | 9/2011 | Poulin | 370/219 |
| 8,160,055 B1* | 4/2012 | Nadeau et al. | 370/351 |
| 8,218,569 B2* | 7/2012 | DelRegno et al. | 370/466 |

(Continued)

OTHER PUBLICATIONS

S. Bryant et al., Packet Pseudowire Encapsulation over an MPLS PSN, Internet Engineering Task Force (IETF) Internet-Draft draft-bryant-pwe3-packet-pw-04.txt, Internet Society, Reston, VA, Jul. 8, 2010.

(Continued)

*Primary Examiner* — Man Phan
(74) *Attorney, Agent, or Firm* — The Law Office of Kirk D. Williams

(57) ABSTRACT

In one embodiment, line cards of packet switching or other network devices are configured for terminating pseudowires. Typically, this includes multiple line cards being configured for terminating a same pseudowire, which allows the corresponding pseudowire traffic to be received by any one of these multiple line cards. Each of these pseudowire-terminating line cards is typically configured to apply one or more features to a pseudowire packet. Examples of these features include, but are not limited to: Access Control List, Quality of Service, Netflow, and Lawful Intercept. For a received packet to be sent out one of these pseudowires, a two-stage lookup operation can be used to first identify the pseudowire over which to forward the packet; and a second lookup operation based on the pseudowire to identify forwarding information corresponding to a path through a network over which a corresponding pseudowire is configured.

27 Claims, 6 Drawing Sheets

(56) References Cited

U.S. PATENT DOCUMENTS

| | | | |
|---|---|---|---|
| 8,274,977 B2* | 9/2012 | Mohapatra et al. | 370/389 |
| 8,284,678 B2* | 10/2012 | Kini et al. | 370/241.1 |
| 8,295,278 B2* | 10/2012 | Shah et al. | 370/389 |
| 8,345,680 B2* | 1/2013 | Poulin et al. | 370/389 |
| 8,345,682 B2* | 1/2013 | Pignataro et al. | 370/389 |
| 2003/0002505 A1* | 1/2003 | Hoch et al. | 370/392 |
| 2006/0002370 A1* | 1/2006 | Rabie et al. | 370/351 |
| 2008/0253381 A1* | 10/2008 | Ward et al. | 370/396 |
| 2010/0040206 A1* | 2/2010 | DelRegno et al. | 379/32.01 |
| 2011/0182189 A1* | 7/2011 | Martini et al. | 370/248 |
| 2011/0268130 A1* | 11/2011 | Tsier et al. | 370/420 |
| 2011/0286462 A1* | 11/2011 | Kompella | 370/395.53 |
| 2011/0292937 A1* | 12/2011 | Gupta et al. | 370/390 |
| 2012/0036279 A1* | 2/2012 | Boutros et al. | 709/238 |
| 2012/0063450 A1* | 3/2012 | Pignataro et al. | 370/389 |
| 2012/0170461 A1* | 7/2012 | Long | 370/235 |
| 2012/0198064 A1* | 8/2012 | Boutros et al. | 709/225 |
| 2012/0236734 A1* | 9/2012 | Sampath et al. | 370/252 |

OTHER PUBLICATIONS

S. Bryant et al., Packet Pseudowire Encapsulation over an MPLS PSN, Internet Engineering Task Force (IETF) Internet-Draft draft-ietf-pwe3-packet-pw-00.txt, Internet Society, Reston, VA, Jan. 11, 2011.

* cited by examiner

TERMINATION OF A PSEUDOWIRES ON MULTIPLE LINE CARDS

TECHNICAL FIELD

The present disclosure relates generally to communicating information over a network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

In computer networking and telecommunications, a pseudowire is an emulation of a layer 2 point-to-point connection-oriented service over a packet-switching network (PSN). The pseudowire emulates the operation of a "transparent wire" carrying the service. Examples of services being carried over the "wire" may be Asynchronous Transfer Mode (ATM), Frame Relay, Ethernet, low-rate Time-division multiplexing (TDM), or Synchronous optical networking (SONET), while the packet network may be Multiprotocol Label Switching (MPLS), Internet Protocol (IPv4 or IPv6), or Layer 2 Tunneling Protocol Version 3 (L2TPv3).

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
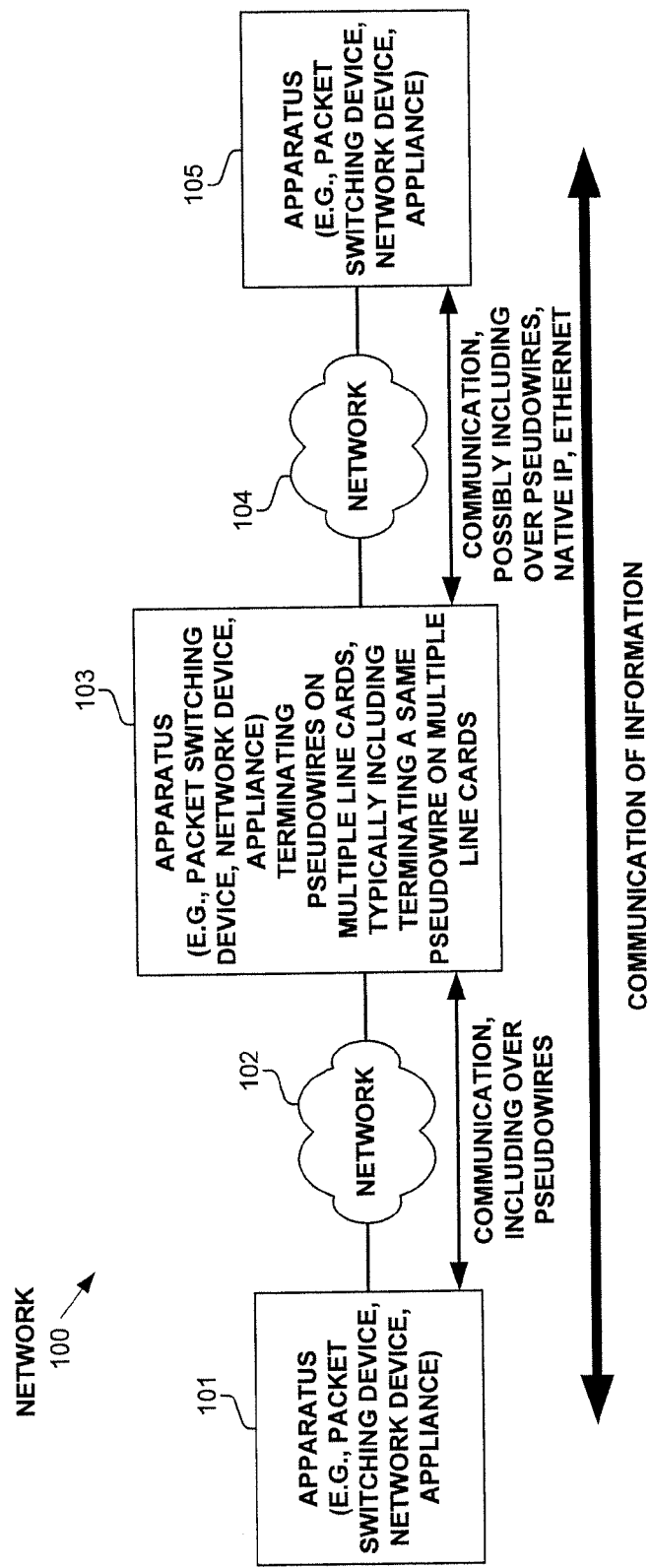
FIG. 1 illustrates a network operating according to one embodiment.

Disclosed are, inter alia, methods, apparatus, computer-storage media, mechanisms, and means associated with terminating pseudowires on line cards, possibly including a same pseudowire terminated on multiple line cards. As used herein, terminating of a pseudowire refers to an endpoint of the pseudowire for receiving and/or sending packets over the pseudowire.

One embodiment includes: an apparatus (e.g., packet switching device, network appliance, network node), comprising: a plurality of line cards, including a plurality of pseudowire terminating line cards configured for terminating a same pseudowire, and an egress line card. Terminating the same pseudowire includes, for a pseudowire packet received on the same pseudowire by one of the plurality of pseudowire terminating line cards: determining, based on one or more fields of a first packet encapsulated in said received pseudowire packet, to forward the first packet to the egress line card; and forwarding the first packet to the egress line card.

In one embodiment, an apparatus comprises: a plurality of line cards, including a plurality of pseudowire terminating line cards configured for terminating a same pseudowire, and an ingress line card. The ingress line card is configured to receive a first packet from a source external to the apparatus, to determine a particular pseudowire terminating line card of the plurality of pseudowire terminating line cards, and to forward the first packet to the particular pseudowire terminating line card. Each of the plurality of pseudowire terminating line cards is configured to send a pseudowire packet, encapsulating the first packet, from the apparatus.

In one embodiment, a packet switching device receives a packet on an ingress line card from a source external to the packet switching device. The packet switching device performs a first lookup operation based on the packet to identify a particular pseudowire. The packet switching device then performs a second lookup operation based on the particular pseudowire in identifying forwarding information for the pseudowire packet. The packet switching devices encapsulates the packet in a pseudowire packet; and sends the pseudowire packet from a particular pseudowire terminating line card of the packet switching device to a destination external to the packet switching device.

In one embodiment, a packet switching device configures each of multiple pseudowire terminating line cards in the packet switching device to include terminating a pseudowire. Terminating a pseudowire includes, for a pseudowire packet received on a pseudowire by one of the pseudowire terminating line cards: determining, based on one or more fields of a first packet encapsulated in said received pseudowire packet, to forward the first packet to a different line card of the packet switching device; and forwarding the first packet to the different line card. In one embodiment, a plurality of these pseudowire terminating line cards are configured to terminate a same pseudowire.

2. Description

Disclosed are, inter alia, methods, apparatus, computer-storage media, mechanisms, and means associated with terminating pseudowires on line cards, possibly including a same pseudowire terminated on multiple line cards. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Expressly turning to the figures, FIG. 1 illustrates a network 100 operating according to one embodiment. In the center of FIG. 1 is an apparatus 103 (e.g., packet switching device, network device, appliance) configured to terminate pseudowires on multiple line cards. In one embodiment, a same pseudowire is terminated on multiple line cards. As used herein, terminating of a pseudowire refers to an endpoint of the pseudowire for receiving and/or sending packets over the pseudowire. In one embodiment, apparatus 103 communicates with apparatus 101 over network 102, including over pseudowires. In one embodiment, apparatus 103 communicates with apparatus 105 over network 104, possibly including over pseudowires, using native Internet Protocol (IP) and/or Ethernet packets, etc.

Figure 2:
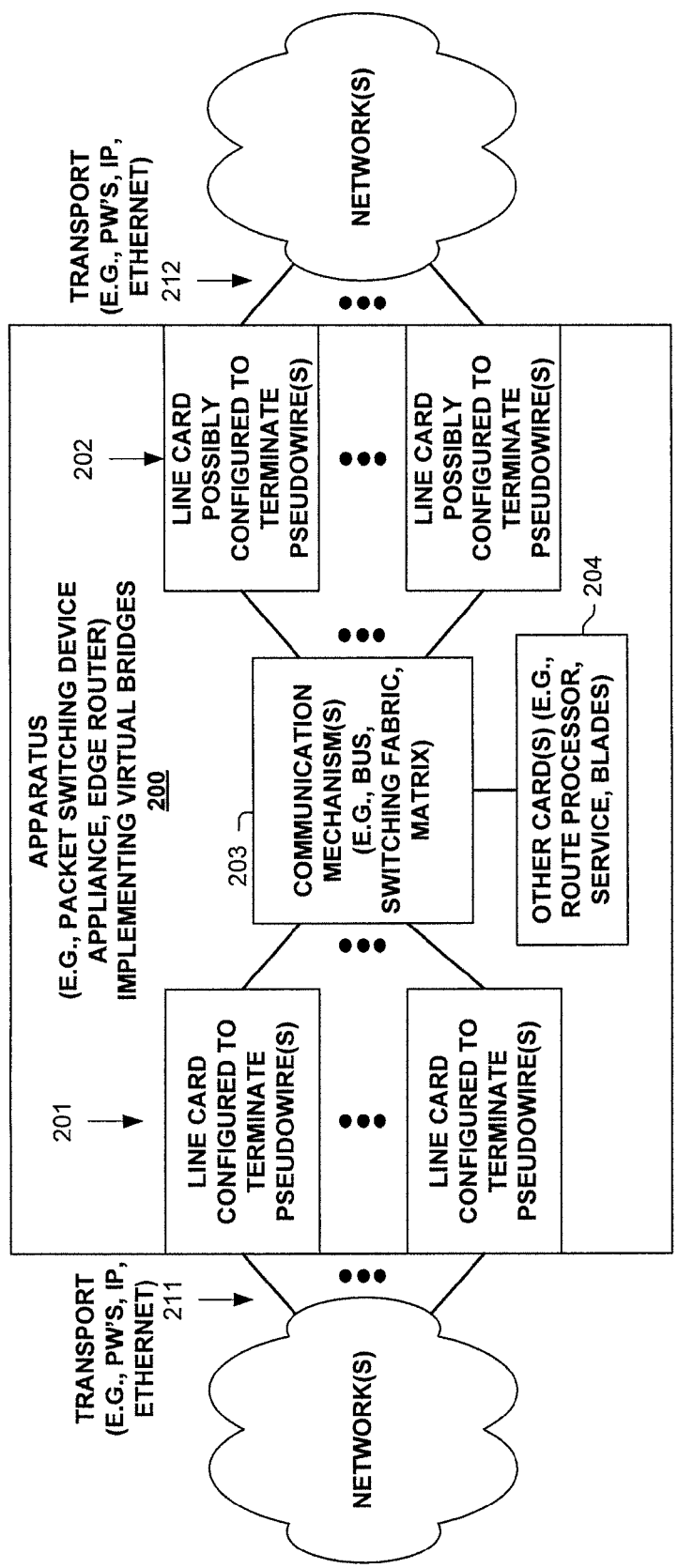
FIG. 2 illustrates a network operating according to one embodiment.

FIG. 2 illustrates an apparatus 200 used in one embodiment. As shown, apparatus 200 includes line cards 201, 202 communicatively coupled via a communication mechanism 203 (e.g., bus, switching fabric, matrix), as well as one or more other cards 204 (e.g., router processor, service blades). In one embodiment, apparatus 200 includes multiple line cards (201), each configured to terminate one or more pseudowires (211) (and typically send and receive IP, Ethernet and/or other types of traffic). In one embodiment, one or more sets of two or more line cards (201) are configured to terminate a same pseudowire (211). Similarly, in one embodiment, apparatus 200 includes multiple line cards (202), each configured to send and receive packet traffic over transport 212, which may include IP traffic, Ethernet traffic, pseudowires, and/or other transport technologies. Thus, in one embodiment, pseudowire packets may be communicated to and from apparatus 200 via one or more line cards 201 with corresponding packets sent and received by line cards 202 as pseudowire packets (possibly on different pseudowires), IP packets, Ethernet packets, and/or other types of packets.

In one embodiment, all of line cards 201 are configured to terminate a particular pseudowire (even though one of these line cards cannot receive a packet on the particular pseudowire). However, in one embodiment, less than all of line cards 201 are configured to terminate a particular pseudowire. Which line cards (201) are so configured is typically based on the set of line cards can possibly send or receive packets on the particular pseudowire, which is typically a function of the network configuration external to apparatus 200. In one embodiment, the set of line cards to configure for terminating a particular pseudowire is manually configured by an operator or management system of apparatus 200. For example, a possible participating interface list is configured for each pseudowire. In one embodiment, apparatus 200 determines the set of line cards 201 to configure for terminating the particular pseudowire (e.g., its interface list) based on dynamic or static network configuration information, such as that exchanged with other network devices (e.g., via a routing protocol).

Terminating pseudowires on multiple line cards 201 and possibly 202 is advantageous over prior solutions that terminated all pseudowires in a single common place, such as on a service card (204). Thus, all pseudowire packets sent from, and received by, apparatus 200 went through this pseudowire service card. In contrast, one embodiment terminates pseudowires directly on line cards 201 and/or 202. Thus, all pseudowire packets associated with different line cards do not have to go through a common place (e.g., a pseudowire service card). Further, one embodiment provides a more efficient use of the resources of apparatus 200, as pseudowire-related packets can flow directly between ingress and egress line cards, with pseudowire processing performed thereon, making the data plane processing of packets more efficient. Distributing of the pseudowire configuration information to multiple line cards may use additional storage and configuration processing (e.g., pseudowire forwarding info nation replicated in multiple places); however, the use of these additional resources is typically offset by the gains in efficiency achieved by the data plane processing of pseudowire packets.

Figure 3:
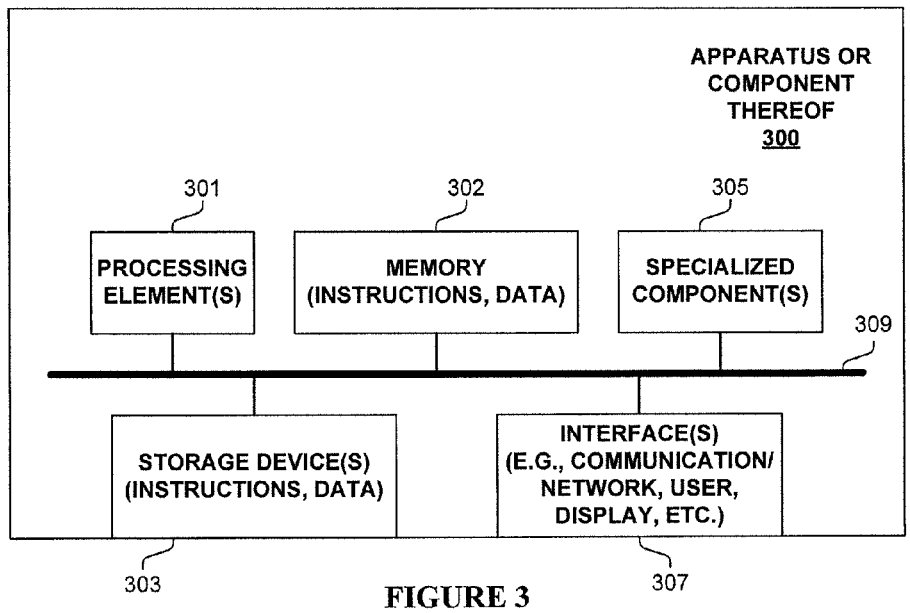
FIG. 3 illustrates an apparatus, appliance or component used in one embodiment.

FIG. 3 is block diagram of an apparatus or component 300 used in one embodiment associated with the rate of transmitting information to a remote device in response to attributing a detected loss of previous information sent to the remote device as not being a result of network congestion. In one embodiment, apparatus or component 300 performs one or more processes corresponding to one of the flow diagrams illustrated or otherwise described herein.

In one embodiment, apparatus or component 300 includes one or more processing element(s) 301, memory 302, storage device(s) 303, specialized component(s) 305 (e.g. optimized hardware such as for performing operations, etc.), and interface(s) 307 for communicating information (e.g., sending and receiving packets, user-interfaces, displaying information, etc.), which are typically communicatively coupled via one or more communications mechanisms 309, with the communications paths typically tailored to meet the needs of the application. In one embodiment apparatus or component 300 corresponds to, or is part of, apparatus 103 of FIG. 1. In one embodiment apparatus or component 300 corresponds to, or is part of, apparatus 200 of FIG. 2.

Various embodiments of apparatus or component 300 may include more or less elements. The operation of apparatus or component 300 is typically controlled by processing element(s) 301 using memory 302 and storage device(s) 303 to perform one or more tasks or processes. Memory 302 is one type of computer-readable/computer-storage medium, and typically comprises random access memory (RAM), read only memory (ROM), flash memory, integrated circuits, and/or other memory components. Memory 302 typically stores computer-executable instructions to be executed by processing element(s) 301 and/or data which is manipulated by processing element(s) 301 for implementing functionality in accordance with an embodiment. Storage device(s) 303 are another type of computer-readable medium, and typically comprise solid state storage media, disk drives, diskettes, networked services, tape drives, and other storage devices. Storage device(s) 303 typically store computer-executable instructions to be executed by processing element(s) 301 and/or data which is manipulated by processing element(s) 301 for implementing functionality in accordance with an embodiment.

Figure 4:
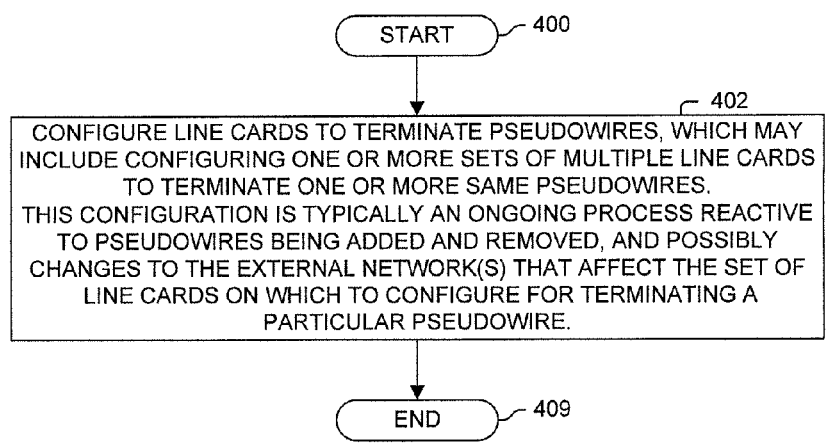
FIG. 4 illustrates a process performed in one embodiment.

FIG. 4 illustrates a process performed in one embodiment. Processing begins with process block 400. In process block 402, line cards are configured to terminate pseudowires. This may include configuring one or more sets of multiple line cards to terminate one or more same pseudowires. The pseudowire configuration of line cards is typically an ongoing process, reactive to pseudowires being added and/or removed; as well as changes in a network configuration affecting a set of line cards to configure for terminating a particular pseudowire. Processing of the flow diagram of FIG. 4 is complete, as indicated by process block 409.

Figure 5:
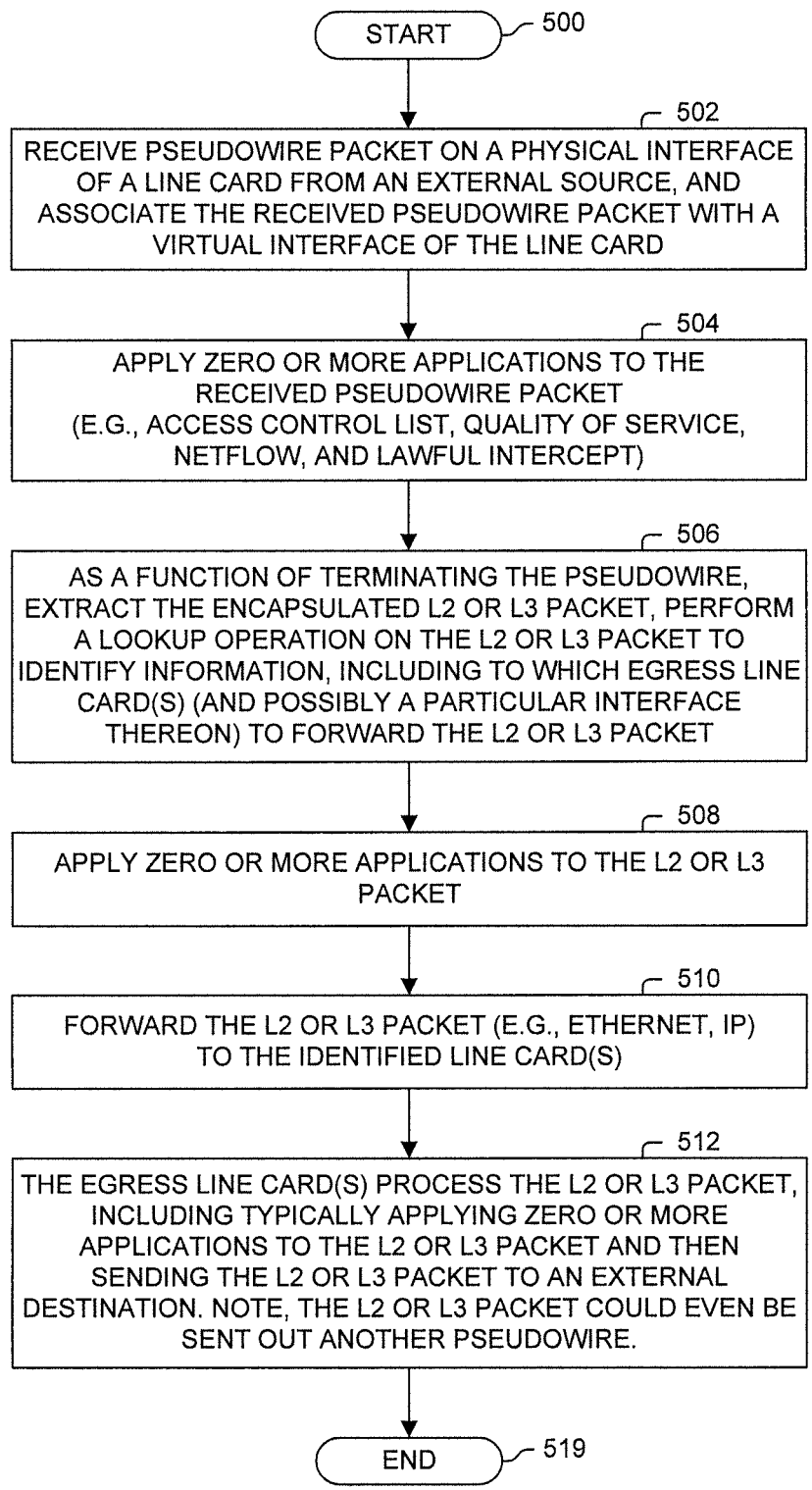
FIG. 5 illustrates a process performed in one embodiment.

FIG. 5 illustrates a process performed in one embodiment. Processing begins with process block 500. In process block 502, a pseudowire packet is received on a physical interface of a line card from an external source. The received pseudowire packet is associated with a virtual interface of the line card.

Virtual interfaces are used in packet switching systems, and typically appear to packet processing devices as the same as a physical interface. In essence, the information of a received or to be sent packet is placed in a data structure (pretty much being the same whether corresponding to a physical or virtual interface), allowing the data therein to be manipulated by the packet processor. Using virtual interfaces allows different packet flows, and in this case, different or multiple pseudowires to flow through a same or different virtual interface, which allows applications (e.g., Access Control List, Quality of Service, Netflow, and Lawful Intercept) to be applied to packets as they flow through the virtual interface. Note, the nouns "application" and "service" are used interchangeably herein.

For example, multiple pseudowires may be attached to a same physical interface. By associating each pseudowire (or sets of one or more pseudowires) with a different virtual interface, these pseudowires can be processed differently. For example, one pseudowire might be policed at a first rate; while a second pseudowire might be policed at a second rate. Note, many applications (e.g., Access Control List) applied to individual packets of a pseudowire without regard to other packets of the pseudowire.

However, a policer or scheduler (e.g., Quality of Service) might depend on an aggregate received traffic rate. When a same pseudowire is terminated on multiple line cards, and for example, the pseudowire is policed at a particular receiving rate, then which packets should be policed raises an issue. In such a situation, one embodiment configures a policer on each line card to police at the policing rate. The desired policing may be accomplished by restricting the external network to send all packets associated with a pseudowire to a single line card, or if policing on packet flows within a pseudowire, all packets of a policed packet flow are delivered to the apparatus (e.g., packet switching device) on a same line card. In one embodiment, line cards within an apparatus exchange policing (in this example or other dynamic) information to appropriately apply the application simultaneously on multiple line cards. Even in the case of policing where packets of a pseudowire are received on a single line card, it is still advantageous for multiple line cards to be configured to terminate this same pseudowire, as a network change might result in the packets of this same pseudowire to be received on the other line card, which is already configured to terminate this same pseudowire.

The processing of outbound packets of a same pseudowire terminated on multiple line cards can be handled in a similar manner, such as by sending all packets of a particular pseudowire to a single one of the line cards, when an application to be applied is dependent on one or more characteristics of the overall flow of packets of the pseudowire. Additionally, line cards in one embodiment exchange information so in order to apply such an application, packets of a same pseudowire are not required to be processed by a same line card. And of course, when only applications are applied that are not dependent on the aggregate packet flow, these packets can be sent within the apparatus to any of its line cards configured to terminate the corresponding pseudowire.

Returning to the processing of the flow diagram of FIG. 5, in process block 504, zero or more applications are applied to the received pseudowire packet. in process block 506, as a function of terminating the pseudowire, the encapsulated L2 (e.g., Ethernet) or L3 (e.g., IP) packet, perform a lookup operation on the L2 or L3 packet to identify forwarding information, typically including to which egress line card(s) (and possibly a particular interface thereon) to forward the L2 or L3 packet. In process block 508, zero or more applications are applied to the L2 or L3 packet. In process block 510, the L2 or L3 packet is forwarded to the identified egress line card(s). In process block 512, the egress line card(s) process the L2 or L3 packet, typically including applying zero or more applications to the L2 or L3 packet, and sending the L2 or L3 packet from the apparatus to an external destination. Note in one embodiment, this processing includes encapsulating the L2 or L3 packet and sending the encapsulating packet out another pseudowire. Processing of the flow diagram of FIG. 5 is complete as indicated by process block 519.

Figure 6:
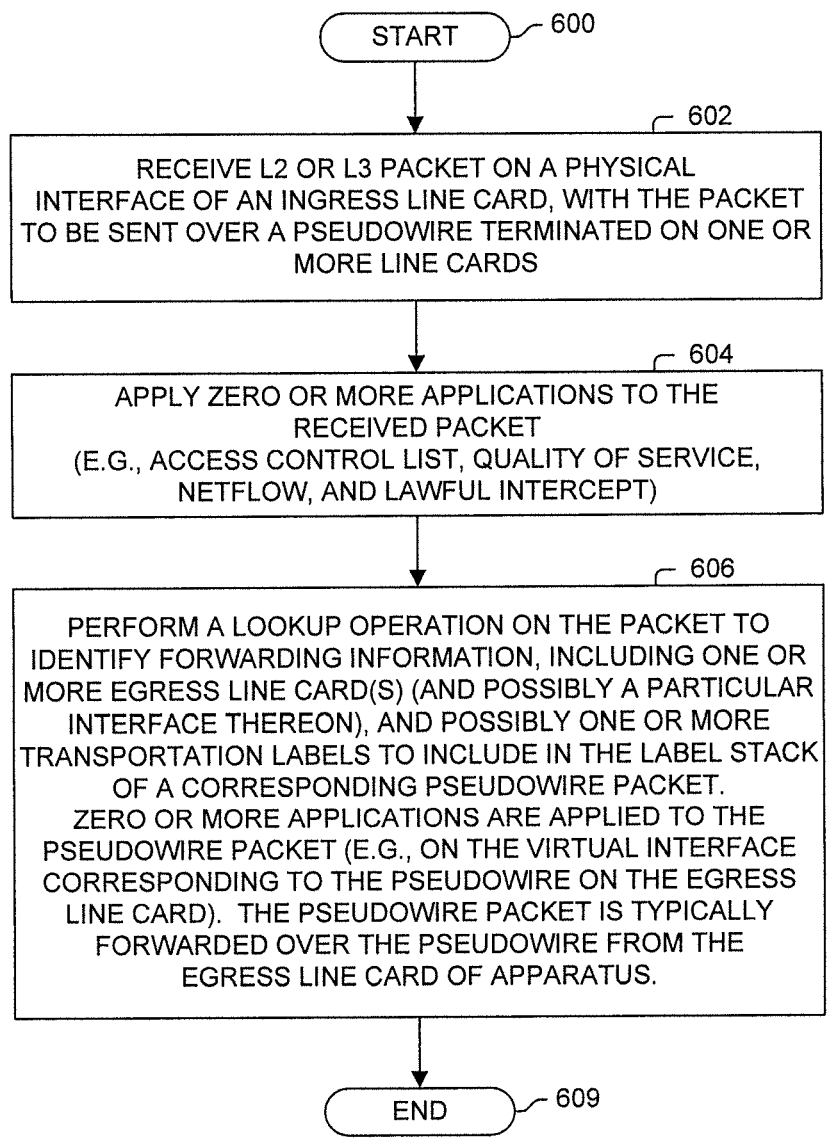
FIG. 6 illustrates a process performed in one embodiment.

FIG. 6 illustrates a process performed in one embodiment. Processing begins with process block 600. In process block 602, an L2 or L3 packet is received on a physical interface of an ingress line card, with the packet to be sent over a pseudowire terminated on one or more line cards of the apparatus. In process block 604, zero or more applications are applied to the received packet. In process block 606, a lookup operation is performed on the received packet to identify forwarding information, including one or more egress line card(s) (and possibly a particular interface thereon) that are configured to terminate the corresponding pseudowire over which the received packet is to be sent. This forwarding information may include one or more transportation labels to include in a label stack of a corresponding pseudowire packet. Additionally, zero or more applications are applied to the pseudowire packet (e.g., on the virtual interface corresponding to the pseudowire on the egress line card). The pseudowire packet is typically forwarded over the pseudowire from the egress line card of the apparatus (e.g., unless dropped or otherwise rerouted in response to the application applied to the pseudowire packet). Processing of the flow diagram of FIG. 6 is complete as indicated by process block 609.

Figure 7:
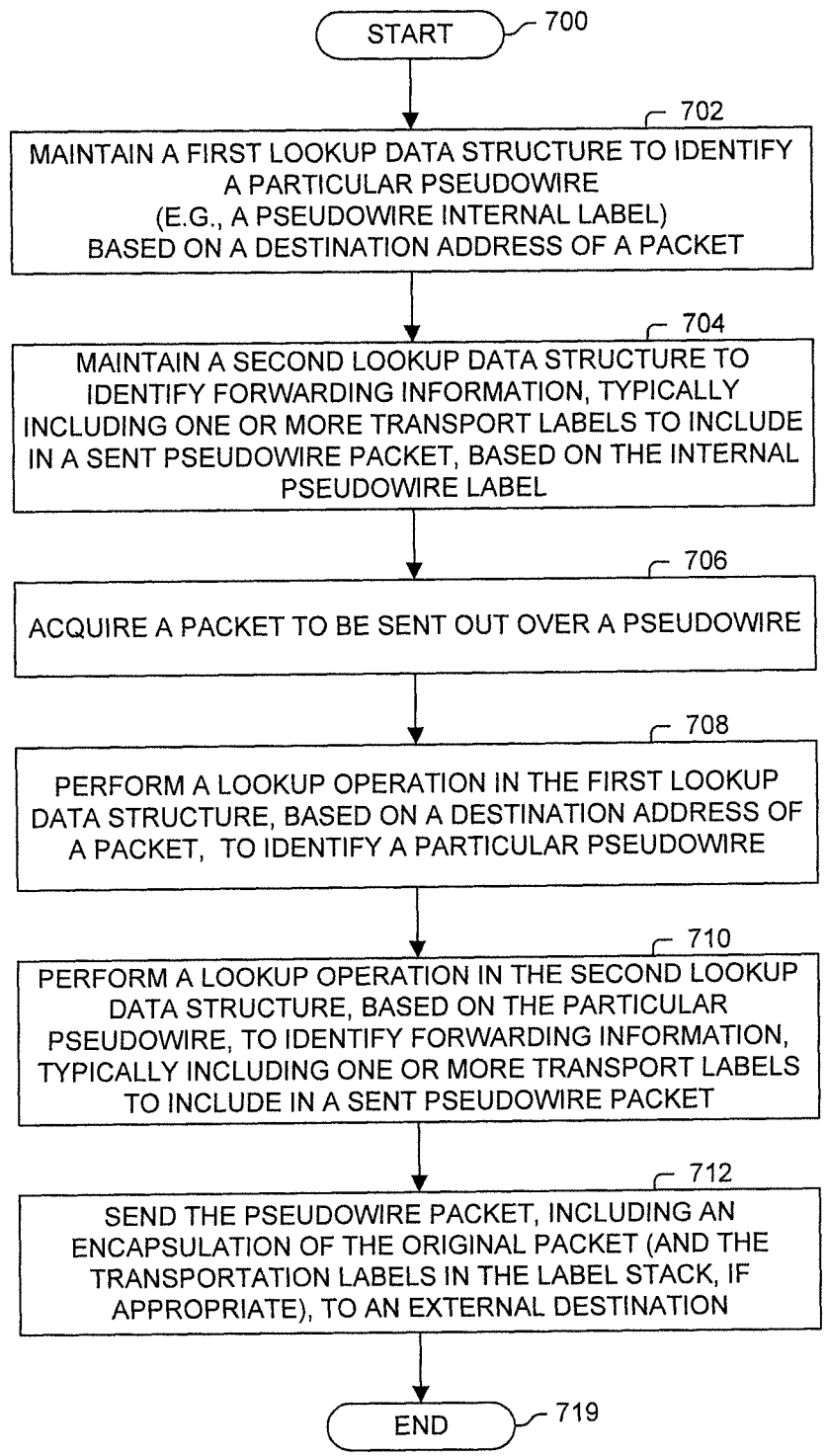
FIG. 7 illustrates a process performed in one embodiment.

FIG. 7 illustrates a process performed in one embodiment. Processing begins with process block 700. In process block 702, a first lookup data structure is maintained (typically an ongoing process) to identify a particular pseudowire (e.g., a pseudowire internal label) based on a destination address of a packet. In process block 704, a second lookup data structure is maintained (also, typically an ongoing process) to identify forwarding information (typically including one or more transport labels to be included in a label stack of a pseudowire packet transported on an MPLS network) based on a particular pseudowire (e.g., the pseudowire internal label identified by the first lookup operation). Maintaining this forwarding information in two different databases (in contrast to the traditional approach of including all in a single database), allows each of these two entities to separately converge. Remember, a pseudowire is a transport conduit on top of a transport network. The endpoints of a pseudowire might stay the same, even though the underlying transport network might change (and vice versa, or some combination as typically both of the entities of pseudowires and transport network are dynamic in nature). Allowing these two entities to independently converge may significantly reduce the resources, including time, for the convergence of information when one or both of these entities change. For example, traditionally, when a change in the transport network affected the path of a pseudowire, the routing information for pseudowire also changed and therefore a long forwarding tree of information had to be updated. In one embodiment, a change to a transport network that still does not affect the endpoints of a pseudowire does not result in a change to the first (pseudowire) lookup data structure.

Returning to the data plane processing of packets described in the flow diagram of FIG. 7. In process block 706, a packet is acquired (e.g., received, generated such as by a route processor) that is to be sent out a pseudowire. In process block 708, a lookup operation is performed in the first lookup data structure, based on a destination address of the packet, to identify a corresponding particular pseudowire (e.g., a pseudowire internal label in one embodiment). In process block 710, a lookup operation is performed in the second lookup data structure, based on the particular pseudowire, to identify forwarding information for the pseudowire packet, which typically includes one or more transport labels to include in the label stack of a pseudowire packet being transported over a MPLS network. In process block 712, the pseudowire packet, including the encapsulated original packet, is sent from the apparatus to an external destination. Processing of the flow diagram of FIG. 7 is complete as indicated by process block 719.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus, comprising:
a plurality of line cards, including a plurality of pseudowire terminating line cards configured for terminating a same side of a same particular pseudowire, and an egress line card;
wherein said terminating the same side of the same particular pseudowire includes, for a pseudowire packet received on the same side of the same particular pseudowire by one of the plurality of pseudowire terminating line cards:
determining, based on one or more fields of a first packet encapsulated in said received pseudowire packet, to forward the first packet to the egress line card; and
forwarding the first packet to the egress line card.

2. The apparatus of claim 1, wherein the egress line card is configured to forward the first packet from the apparatus.

3. The apparatus of claim 2, wherein the egress line card is also an ingress line card; wherein the ingress line card is configured to receive a second packet from a source external to the apparatus, to determine a particular pseudowire terminating line card of the plurality of pseudowire terminating line cards, and to forward information including the second packet to the particular pseudowire terminating line card;
wherein each of the plurality of pseudowire terminating line cards is configured to send a second pseudowire packet, encapsulating the second packet, from the apparatus.

4. The apparatus of claim 3, wherein the ingress line card is configured to perform a first lookup operation based on the second packet to identify a particular pseudowire, and a second lookup operation based on the particular pseudowire in identifying one or more transportation labels for including in a label stack of the second pseudowire packet; wherein said information includes said one or more transportation labels.

5. The apparatus of claim 3, wherein each of the plurality of pseudowire terminating line cards is configured to apply one or more features to the second pseudowire packet; wherein said feature is one from a group consisting of: Access Control List, Quality of Service, Netflow, and Lawful Intercept.

6. The apparatus of claim 1, wherein each of the plurality of pseudowire terminating line cards is configured to not forward the pseudowire packet to the egress line card along with the first packet.

7. The apparatus of claim 1, wherein said terminating the same particular pseudowire includes applying one or more features to said received pseudowire packet; wherein said feature is one from a group consisting of: Access Control List, Quality of Service, Netflow, and Lawful Intercept.

8. The apparatus of claim 1, wherein the first packet is an Internet Protocol (IP) packet; and the apparatus is a packet switching device.

9. The apparatus of claim 1, wherein the plurality of line cards includes an ingress line card;
wherein the ingress line card is configured to receive a second packet from a source external to the apparatus, to determine a particular pseudowire terminating line card of the plurality of pseudowire terminating line cards, and to forward information including the second packet to the particular pseudowire terminating line card;
wherein each of the plurality of pseudowire terminating line cards is configured to send a second pseudowire packet, encapsulating the second packet, from the apparatus.

10. The apparatus of claim 9, wherein the ingress line card is configured to perform a first lookup operation based on the second packet to identify a particular pseudowire, and a second lookup operation based on the particular pseudowire in identifying forwarding information for the second pseudowire packet; wherein said information said forwarded to the particular pseudowire terminating line card includes said forwarding information.

11. The apparatus of claim 10, wherein said forwarding information includes one or more labels to include in a label stack of the second pseudowire packet.

12. The apparatus of claim 9, wherein each of the first packet and the second packet is an Internet Protocol (IP) packet.

13. The apparatus of claim 9, wherein each of the plurality of pseudowire terminating line cards is configured to apply one or more features to the second pseudowire packet; wherein said feature is one from a group consisting of: Access Control List, Quality of Service, Netflow, and Lawful Intercept.

14. The apparatus of claim 1, wherein the egress line card is one of the plurality of pseudowire terminating line cards.

15. An apparatus, comprising:
a plurality of line cards, including a plurality of pseudowire terminating line cards configured for terminating a same side of a same particular pseudowire, and an ingress line card;
wherein the ingress line card is configured to receive a first packet from a source external to the apparatus, to determine a particular pseudowire terminating line card of the plurality of pseudowire terminating line cards, and to forward the first packet to the particular pseudowire terminating line card; and
wherein each of the plurality of pseudowire terminating line cards is configured to send a pseudowire packet, encapsulating the first packet, from the apparatus over the same particular pseudowire.

16. The apparatus of claim 15, wherein the ingress line card is configured to perform a first lookup operation based on the first packet to identify a particular pseudowire, and a second lookup operation based on the particular pseudowire in identifying forwarding information for the pseudowire packet.

17. The apparatus of claim 16, wherein said forwarding information includes one or more labels to include in a label stack of the pseudowire packet.

18. The apparatus of claim 15, wherein each of the plurality of pseudowire terminating line cards is configured to apply one or more features to the pseudowire packet; wherein said feature is one from a group consisting of: Access Control List, Quality of Service, Netflow, and Lawful Intercept.

19. The apparatus of claim 15, wherein the first packet is an Internet Protocol (IP) packet.

20. The apparatus of claim 15, wherein the ingress line card is one of the plurality of pseudowire terminating line cards.

21. A method, comprising:
terminating a same side of a same particular pseudowire on each of a plurality of pseudowire terminating line cards of a packet switching device; wherein the plurality of pseudowire terminating line cards includes a particular pseudowire terminating line card;
receiving, on an ingress line card of the packet switching device, a packet from a source external to the packet switching device;
performing, by the packet switching device, a first lookup operation based on the packet to identify the same particular pseudowire;
performing, by the packet switching device, a second lookup operation based on the same particular pseudowire in identifying forwarding information for sending over the same particular pseudowire;
encapsulating, by the packet switching device, the packet in a pseudowire packet; and
sending, by a particular pseudowire terminating line card of the packet switching device, the pseudowire packet from the packet switching device.

22. The method of claim 21, wherein said forwarding information includes one or more transportation labels; and wherein the pseudowire packet includes said one or more transportation labels in a label stack.

23. A method, comprising:
configuring, by a packet switching device, each of two or more of pseudowire terminating line cards in the packet switching device to include terminating one or more pseudowires;
wherein said terminating the pseudowire includes, for a pseudowire packet received on the pseudowire by one of said two or more pseudowire terminating line cards:
determining, based on one or more fields of a first packet encapsulated in said received pseudowire packet, to forward the first packet to a different line card of the packet switching device; and
forwarding the first packet to the different line card;
wherein said two or more pseudowire terminating line cards includes a plurality of pseudowire terminating line cards terminating a same side of a same particular pseudowire, such that the configuration of all of the plurality of pseudowire terminating line cards at a same point in time includes terminating the same side of a same particular pseudowire the same particular pseudowire.

24. The method of claim 23, comprising:
receiving a second pseudowire packet on a second pseudowire terminating line card of the plurality of pseudowire terminating line cards;
determining, based on one or more fields of a second packet encapsulated in said received second pseudowire packet, to forward the second packet to an egress line card of the packet switching device;
forwarding the second packet to the egress line card;
receiving a third pseudowire packet on a third pseudowire terminating line card of the plurality of pseudowire terminating line cards, wherein the second and third pseudowire terminating line cards are different;
determining, based on one or more fields of a third packet encapsulated in said received third pseudowire packet, to forward the third packet to the egress line card; and
forwarding the third packet to the egress line card.

25. The apparatus of claim 15, wherein the apparatus is a packet switching device.

26. An apparatus, comprising:
a plurality of line cards, including a plurality of pseudowire terminating line cards configured for terminating a pseudowire, and an ingress line card;
wherein the ingress line card is configured to receive a first packet from a source external to the apparatus, to determine a particular pseudowire terminating line card of the plurality of pseudowire terminating line cards, and to forward the first packet to the particular pseudowire terminating line card;

wherein each of the plurality of pseudowire terminating line cards is configured to send a pseudowire packet, encapsulating the first packet, from the apparatus; and wherein the ingress line card is configured to perform a first lookup operation based on the first packet to identify a particular pseudowire, and a second lookup operation based on the particular pseudowire in identifying forwarding information for the pseudowire packet.

27. The apparatus of claim 26, wherein the apparatus is a packet switching device.

\* \* \* \* \*

UNITED STATES PATENT AND TRADEMARK OFFICE
CERTIFICATE OF CORRECTION

PATENT NO. : 8,848,716 B2
APPLICATION NO. : 13/084531
DATED : September 30, 2014
INVENTOR(S) : Ramakrishnan et al.

It is certified that error appears in the above-identified patent and that said Letters Patent is hereby corrected as shown below:

In the Specification

Col. 4, Line 54, replace "info nation" with -- information --

Signed and Sealed this
Tenth Day of March, 2015

Michelle K. Lee
*Deputy Director of the United States Patent and Trademark Office*